US008891679B2

(12) United States Patent
Marsili et al.

(10) Patent No.: US 8,891,679 B2
(45) Date of Patent: *Nov. 18, 2014

(54) POLAR TRANSMITTER SUITABLE FOR MONOLITHIC INTEGRATION IN SOCS

(71) Applicant: Infineon Technologies AG, Neubiberg (DE)

(72) Inventors: Stefano Marsili, Faak am See (AT); Giuseppe Li Puma, Bochum (DE); Stefan Van Waasen, Xanten (DE); Yanzhong Dai, Xi'an (CN); Edwin Thaller, Faak am See (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,982

(22) Filed: Jan. 3, 2014

(65) Prior Publication Data

US 2014/0119476 A1 May 1, 2014

Related U.S. Application Data

(63) Continuation of application No. 12/877,188, filed on Sep. 8, 2010, now Pat. No. 8,625,708.

(51) Int. Cl.
*H04L 27/04* (2006.01)
*H04L 27/36* (2006.01)
*H03C 1/52* (2006.01)
*H04B 1/04* (2006.01)

(52) U.S. Cl.
CPC ............ *H04L 27/361* (2013.01); *H04B 1/0475* (2013.01); *H04B 1/0483* (2013.01)
USPC ........... 375/300; 375/268; 375/295; 375/297; 455/522

(58) Field of Classification Search
CPC ... H04L 1/0003; H04L 1/0071; H04L 27/368; H04L 7/0079; H03F 1/3247; H04B 1/0483
USPC ........... 375/295, 297, 268, 397, 300; 455/522
See application file for complete search history.

(56) References Cited

U.S. PATENT DOCUMENTS 7,639,992 B2   12/2009   Jensen et al.
7,877,060 B1 *  1/2011   Khlat et al. ................... 455/63.1

(Continued)

FOREIGN PATENT DOCUMENTS

EP         1150422 A2    10/2001

OTHER PUBLICATIONS

Non-Final Office Avtion dated Apr. 3, 2013 for U.S. Appl. No. 12/877,188. 17 Pages.

(Continued)

*Primary Examiner* — Ted Wang
(74) *Attorney, Agent, or Firm* — Eschweiler & Associates, LLC (57) ABSTRACT

The disclosed polar modulation transmitter circuit is configured to generate an output signal having a transmission frequency that minimizes crosstalk effects between different transmission bands (e.g., Bluetooth, GSM, UMTS, etc.). In particular, a polar modulation transceiver circuit, having an amplitude modulated (AM) signal and a phase modulated (PM) signal, comprises a digitally controlled oscillator (DCO) configured to generate a DCO signal having a DCO frequency. The DCO signal is provided to one or more frequency dividers that are configured to selectively divide the DCO signal to generate various lower frequency signals, used to select a sampling rate for a DAC operating on the AM signal and an RF carrier signal frequency, which result in an output signal having a frequency that does not interfere with other RF systems on the same IC (e.g., that falls outside of the downlink frequency of other RF systems). Other systems and methods are also disclosed.

18 Claims, 7 Drawing Sheets

(56) References Cited

U.S. PATENT DOCUMENTS

| | | | |
|---|---|---|---|
| 8,031,790 B2* | 10/2011 | Iida | 375/260 |
| 2007/0183531 A1 | 8/2007 | Ahmed et al. | |
| 2010/0020730 A1 | 1/2010 | Man et al. | |

OTHER PUBLICATIONS

Notice of Allowance dated Oct. 28, 2013 for U.S. Appl. No. 12/877,188. 9 Pages.

* cited by examiner

| fmin [MHz] | fmax [MHz] | Link | Band |
|---|---|---|---|
| 925 | 960 | DL | E-GSM 900 |
| 935 | 960 | DL | GSM 900 |
| 2110 | 2170 | DL | UMTS 1/10 |
| 2620 | 2690 | DL | UMTS 7 |

FIG. 3B

| Harmonic of DAC Clock frequency | Output frequency components (normal mode) | | | Output frequency components (low power mode) | | |
|---|---|---|---|---|---|---|
| | fmin [MHz] | | fmax [MHz] | fmin [MHz] | | fmax [MHz] |
| 8 | 7892.3 | ... | 8148.6 | | | |
| 7 | 7206.0 | ... | 7440.0 | 0.0 | ... | 0 |
| 6 | 6519.7 | ... | 6731.4 | 343.1 | ... | 354.3 |
| 5 | 5833.4 | ... | 6022.9 | 686.3 | ... | 708.6 |
| 4 | 5147.1 | ... | 5314.3 | 1029.4 | ... | 1062.9 |
| 3 | 4460.9 | ... | 4605.7 | 1372.6 | ... | 1417.1 |
| 2 | 3774.6 | ... | 3897.1 | 1715.7 | ... | 1771.4 |
| 1 | 3088.3 | ... | 3188.6 | 2058.9 | ... | 2125.7 |
| 0 | 2402.0 | ... | 2480.0 | 2402.0 | ... | 2480.0 |
| -1 | 1715.7 | ... | 1771.4 | 2745.1 | ... | 2834.3 |
| -2 | 1029.4 | ... | 1062.9 | 3088.3 | ... | 3188.6 |
| -3 | 343.1 | ... | 354.3 | 3431.4 | ... | 3542.9 |
| -4 | -343.1 | ... | -354.3 | 3774.6 | ... | 3897.1 |
| -5 | -1029.4 | ... | -1062.9 | 4117.7 | ... | 4251.4 |
| -6 | -1715.7 | ... | -1771.4 | 4460.9 | ... | 4605.7 |
| -7 | -2402.0 | ... | -2480.0 | 4804.0 | ... | 4960.0 |
| -8 | -3088.3 | ... | -3188.6 | 5147.1 | ... | 5314.3 |

POLAR TRANSMITTER SUITABLE FOR MONOLITHIC INTEGRATION IN SOCS

REFERENCE TO RELATED APPLICATION

This application is a continuation of U.S. application Ser. No. 12/877,188 filed on Sep. 8, 2010.

FIELD OF INVENTION

The present invention relates generally to communication transmitters and in particular to a method and apparatus for generating an RF communication signal on an integrated chip die configured to communicate over a plurality of RF communication bands.

BACKGROUND

Handheld devices, such as cell phones and PDAs, have made drastic technological advances in the past decade. Today's handheld devices offer users a wide range of functionality. This functionality is enabled in part by handheld devices utilizing increasingly sophisticated RF transmission schemes.

In many modern transceivers, RF transmission schemes have moved from a vector modulation to a polar modulation transmission approach. Polar modulation modulates independently both the magnitude and phase of a signal to be transmitted resulting in a number of possible advantages ranging from power savings to increased transmission bandwidth.

DETAILED DESCRIPTION

One or more implementations of the present disclosure will now be described with reference to the attached drawings, where like reference numerals are used to refer to like elements throughout. Nothing in this detailed description is admitted as prior art.

Most next generation handheld devices (e.g., cell phones, PDAs, etc.) offer functionality that utilizes multiple radio frequency (RF) communication bands. For example, many cell phones will offer functions that concurrently use bands of operation such as GSM (Global System for Mobile Communications), UMTS (Universal Mobile Telecommunications System), and Bluetooth. As handheld devices get smaller and functionality continues to increase, it becomes increasingly attractive, in terms of power consumption and space, to combine these RF functions onto one integrated chip.

System on chip (SoC) architectures, configured to accommodate the transmission and/or reception of multiple RF signals, monolithically integrate different RF transmission systems, transmitting/receiving different RF transmission standards such as Bluetooth, GSM and/or UMTS, on an integrated chip die. However, the integration of multiple RF communication systems onto an integrated chip may lead to potential crosstalk problems. For example, RF technologies, such as Bluetooth and GSM, typically employ non-constant envelope modulation schemes in order to achieve high data transfer rates. Since GSM and Bluetooth operate asynchronously in a TDMA access scheme, the non-constant envelope modulation may cause spurious crosstalk, leading to severe desensitization of the corresponding receiver.

Crosstalk is particularly problematic when it falls within downlink frequency bands, wherein one system is transmitting while another is contemporaneously receiving (e.g., assuming that a Bluetooth system is transmitting at an output power of +10 dBm in the 2.45 GHz ISM, and that a GSM system is receiving a signal at a minimum sensitivity level of −112 dBm, the spurious emission of the Bluetooth transmission in the GSM band is at least 10 dB below the actual noise level of the GSM receiver). To avoid signal degradation, SoCs may attempt to isolate RF signals from different systems (e.g., Bluetooth, GSM, etc.), however such isolation is difficult and may not always work.

A method and apparatus for selectively generating a transmission signal (e.g., a Bluetooth signal) at a frequency that does not interfere with other communication signals bands (e.g., GSM/UMTS signals) is provided herein. In one embodiment, a polar modulation transmitter architecture, which may be monolithically integrated onto an integrated chip (IC), is configured to selectively generate a transmission signal at a frequency that minimizes crosstalk effects between different RF systems on the integrated chip. In particular, the transmitter architecture is configured to generate an output signal having a frequency that is not within the downlink band of other RF systems on the integrated chip, thereby minimizing crosstalk effects.

The polar modulation transmitter architecture may be configured to generate an output signal having a selected frequency based upon a frequency generation circuit comprising an oscillator circuit (e.g., a digitally controlled oscillator (DCO), a voltage controlled oscillator (VCO), etc.) and one or more frequency dividers. The one or more frequency dividers are configured to selectively divide a oscillator signal, output from the oscillator circuit, to generate one or more lower frequency signals. The one or more lower frequency signals may comprise a phase modulated carrier signal having a first frequency. The one or more lower frequency signals may also comprise signals that are used to select a clock signal frequency that controls the sampling rate of a DAC configured to convert a digital amplitude modulated signal to an analog current comprising an amplitude modulated signal having a second frequency. By controlling the sampling rate (e.g., the time interval between sampling of the digital signal) the frequency of the analog current output from the DAC may be controlled (e.g., set to a particular value). A mixer may be configured to receive the analog current and the phase modulated carrier signal and modulate the analog current onto the phase modulated carrier signal, thereby resulting in an output signal that does not interfere with other RF systems on the same IC (e.g., that falls outside of the downlink frequency of other RF systems). The output signal is provided to a power amplifier (PA) that delivers an amplified output signal to an antenna.

Accordingly, frequencies of the one or more lower frequency signals may be selectively generated so as to result in an output signal (e.g., output from the mixer) having a transmission frequency that does not interfere with other RF systems (e.g., GSM, UMTS, etc.). Therefore, through selective use of one or more controllable frequency dividers, a polar modulation transmitter circuit may generate an output signal having a particular frequency, selected to minimize crosstalk effects between multiple different RF systems sharing an IC.

It will be appreciated that although the present invention is often described in relation to a system on a chip in the examples provided herein, that the disclosed method and apparatus for frequency generate may be used in a wide range of applications. For example, the present invention may be implemented onto a package with multiple chips (e.g., having a digital part on a chip fabricated in a small technology (28 nm), an analog part on a separate chip fabricated in a larger technology (65 nm), and/or firmware operated on a separate application processor).

Figure 1:
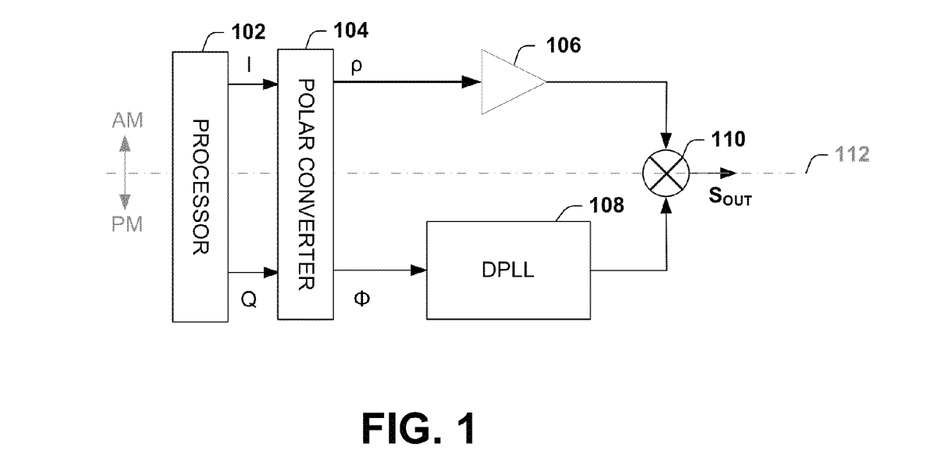
FIG. 1 is a block diagram illustrating an exemplary polar modulation transmitter.

FIG. 1 illustrates an exemplary polar modulation transmitter 100. Polar modulation is performed by separately modulating the amplitude of a signal in an AM signal path (above line 112) and modulating the phase of a signal in a PM signal path (below line 112). As shown in FIG. 1, a baseband processor 102 is configured to generate orthogonal in-phase (I) and quadrature-phase (Q) symbols from a digital signal to be transmitted. A polar converter 104 (e.g., CORDIC) is configured to receive the I/Q symbols and to translate the I/Q data into an amplitude modulation (AM) signal $\rho$ and a phase modulation (PM) signal $\phi$.

The AM signal $\rho$ is provided to a DAC 106 configured to generate an analog current comprising an amplitude modulated signal that varies at a first frequency. The PM signal $\phi$ is provided to a DPLL 108, that performs phase-frequency modulation and generates a phase modulated carrier signal that varies at a second frequency. A mixer 110 is configured to receive the analog AM signal and the phase modulated carrier signal and modulate the amplitude of the analog AM signal onto the phase modulated carrier signal, resulting in an output signal $S_{OUT}$. The resulting signal output from the mixer 110 is an output signal $S_{OUT}$ having frequency components that are the product of the frequency of the analog AM signal (and its harmonics) and the phase modulated carrier signal. The output signal $S_{OUT}$ is provided to a power amplifier (PA) configured to amplify the output signal $S_{OUT}$ and provide the amplified output signal $S_{OUT}$ to an antenna.

Figure 2:
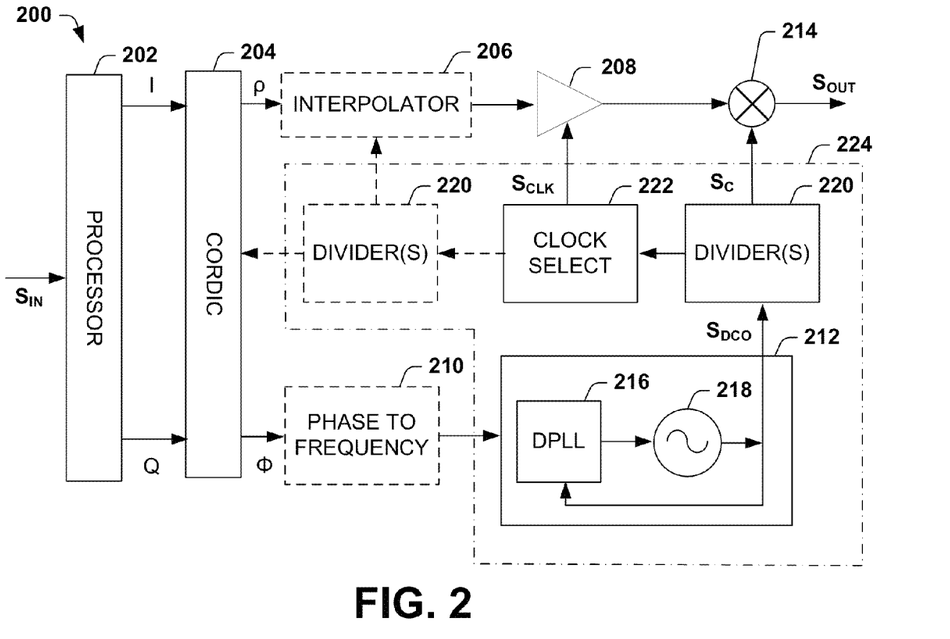
FIG. 2 is a block diagram illustrating an exemplary embodiment of a polar modulation transmitter configured to generate a transmission signal as provided herein.

FIG. 2 illustrates a block diagram of one embodiment of a polar transmitter circuit 200 having an architecture suitable for integration into a SoC. Although a polar transmitter circuit 200 is shown in FIG. 2, it will be appreciated that the frequency generation circuit may be comprised within other transmission circuits such as a polar transceiver circuit. The polar transmitter circuit 200 is configured to generate an output signal $S_{OUT}$ having a frequency that may be variably selected to fall outside of the downlink bands of RF systems generated by transmission systems operating on the same SoC.

As shown in FIG. 2, polar transmitter circuit 200 comprises a baseband processor 202 configured to generate orthogonal in-phase (I) and quadrature-phase (Q) symbols from a digital input signal $S_{IN}$ to be transmitted. A rectangular to polar converter 204 is configured to receive the I/Q symbols and generate therefrom a digital AM signal $\rho$ and a PM signal $\phi$. In one embodiment, the rectangular to polar converter may comprise a CORDIC (Coordinate Rotation Digital Computer) configured to convert amplitudes of I/Q baseband signals into equivalent polar signals. The digital AM signal $\rho$ is transmitted along a first signal path. The PM signal $\phi$ is transmitted along a second signal path. The signals carried by the first and second signal paths are combined by a mixing circuit 214 (e.g., a power amplifier) resulting in an output signal $S_{OUT}$.

The first signal path may optionally comprise one or more interpolators 206 configured to shift the digital AM signal $\rho$ to a proper sampling rate before it is provided to an RF digital to analog converter (RF-DAC) 208. The RF-DAC 208 is configured to convert the digital AM signal $\rho$ to an analog current. The second signal path may optionally comprise a phase to frequency converter 210 that receives the PM signal $\phi$ and converts it to a frequency that is provided to a frequency synthesizer 212. In the embodiment shown in FIG. 2, the frequency synthesizer 212 comprises a DPLL 216 having a digitally controlled oscillator (DCO) 218 driven to output a DCO signal. One of ordinary skill in the art will appreciate that often the DCO 218 is a part of the DPLL 216 and therefore is comprised within the DPLL 216. For example, in one alternative embodiment, the frequency synthesizer 212 may comprise a phase locked loop, where frequency information is converted with a DAC to an analog signal which drives a VCO and PLL combination. However, as provided herein, it is possible to have a DCO 218, configured to generate a DCO signal, that is separate from the DPLL and therefore in some embodiments the DPLL and DCO may comprise separate elements.

The DCO 218, one or more frequency divider circuits 220, and a clock selection circuit 222 collectively comprise a frequency generation circuit 224 configured to generate one or more lower frequency signals that may be used by different components in the polar transmitter 200. In particular, the one or more frequency divider circuits 220 are configured to receive the DCO signal $S_{DCO}$ and to generate one or more lower frequency signals therefrom. In one embodiment, the divider circuits 220 may comprise divider circuits configured upstream to the clock selection circuit 222 to selectively modify the frequency of signals (e.g., analog AM signal and a phase modulated carrier signal) being provided to mixer 214 so that the output of the mixer falls outside of the downlink bands of RF systems generated by transmission systems operating on the same SoC. For example, as shown in FIG. 2, the one or more frequency divider circuits 220 may be configured to provide an analog AM signal and a phase modulated carrier signal $S_C$ having reduced frequencies. In an alternative embodiment (not shown), the DCO signal $S_{DCO}$ may be provided to both the frequency divider circuits 220 and directly to the mixer 214, as a phase modulated carrier signal. Furthermore, in additional embodiments, the divider circuits 220 may further comprise dividers configured downstream of the clock selection circuit 222 to provide for reduced operating frequencies of digital polar transmitter components (e.g., changes in the clock frequency provided to DAC 208 may drive changes in the interpolation rate of interpolators 206 in the AM signal path which can be accounted for using additional dividers downstream of the clock selection circuit 222).

The frequency divider circuits 220 may also be configured to provide a signal having a reduced frequency to the clock selection circuit 222, which generates a clock signal $S_{CLK}$ for sampling of the digital AM signal $\rho$. The clock selection circuit 222 is configured to select an appropriate clock rate for operation of the RF-DAC 208, and through selection of the clock rate determines the frequency of the analog current provided to the mixer 214 (i.e., since successive data values of a digital AM word may be separated by a selected time period based upon the reduced frequency signals, changes can be controlled in the frequency of the analog current output from the DAC 208).

The phase modulated carrier signal $S_C$ and the analog current output from DAC 208 comprise frequencies that are selectively determined, by the frequency divider circuits 220, to result in an output signal $S_{OUT}$ having frequency components in a specifically defined frequency range. The frequency range may be chosen such that mixing of the phase modulated carrier signal $S_C$ and the analog current results in an output signal $S_{OUT}$ having a frequency that is outside of the downlink bands used by different RF systems (e.g., GSM, UMTS, etc.). Therefore, the polar transmitter circuit 200 is enabled to transmit a Bluetooth signal (e.g., on the phase modulated carrier signal) while also allowing for the concurrent reception on other RF signal bands by selective division of a DCO signal $S_{DCO}$ by frequency divider circuits 220.

In one embodiment, the polar transmitter circuit 200 may be configured to selectively generate a frequency of the output signal $S_{OUT}$ based upon which systems (e.g., UMS, GMTS, etc.) of a SoC are actively being transmitted and/or received at a given time. For example, the polar transmitter circuit 200 may be configured to selectively operate the one or more frequency dividers circuits 220 in a manner that generates an output signal $S_{OUT}$ having different frequency when the SoC is concurrently transmitting a Bluetooth signal and receiving a GSM signal than when the SoC is concurrently transmitting a Bluetooth signal and receiving both a GSM signal and a UMTS signal.

It will be appreciated to enable the concurrent transmission/reception of different RF signal bands (e.g., Bluetooth, UMTS, and GSM), the one or more frequency dividers circuits 220 may be configured in different combinations to form different divider paths. For example, a first divider may be configured to divide the DCO signal to a frequency that may be used to generate a clock signal (e.g., a 700 MHz clock signal) that drives sampling of the digital AM signal at a frequency that causes the output signal (and alias replica) to fall outside of the downlink band of GSM and UMTS transmissions. Alternatively, a first divider and a second divider may be configured to both divide the DCO signal to a frequency that may be used to generate a clock signal (e.g., a 350 MHz clock signal) that drives sampling of the digital AM signal at a frequency that causes the output signal (and alias replica) to fall outside of the downlink band of GSM transmissions.

In one embodiment, the one or more frequency divider circuits 220 may be selectively operated to allow a SoC to optimize performance by switching between transmissions on different transmission bands in real time. For example, the first and second dividers may be selectively operated to allow a SoC to transmit a Bluetooth signal while receiving GSM and UMTS signals (normal mode) or to transmit a Bluetooth signal while receiving a GSM signal (low power mode). In one embodiment, operation of the one or more frequency dividers (e.g., switching of the divider paths) can be controlled by firmware after getting a request from a host to activate or deactivate a certain transmission system (e.g., UMTS).

It will be appreciated that the one or more lower frequency signals generated by the one or more frequency dividers 220 shown in FIG. 2 may further comprise a wide range of different reduced frequency signals that may be used throughout the polar transmitter circuit 200 (e.g., in the digital part of the polar transmitter). For example, in one embodiment, operation of the interpolators, comprised within the first signal path, depend upon the output of one or more frequency divider circuits 220. In one embodiment, frequency divider circuits 220 may be configured to reduce the frequency provided to the clock selection circuit 222 to a lower frequency for interpolation and/or to an even lower frequency to drive polar conversion of the I/Q signals.

Figure 3A:
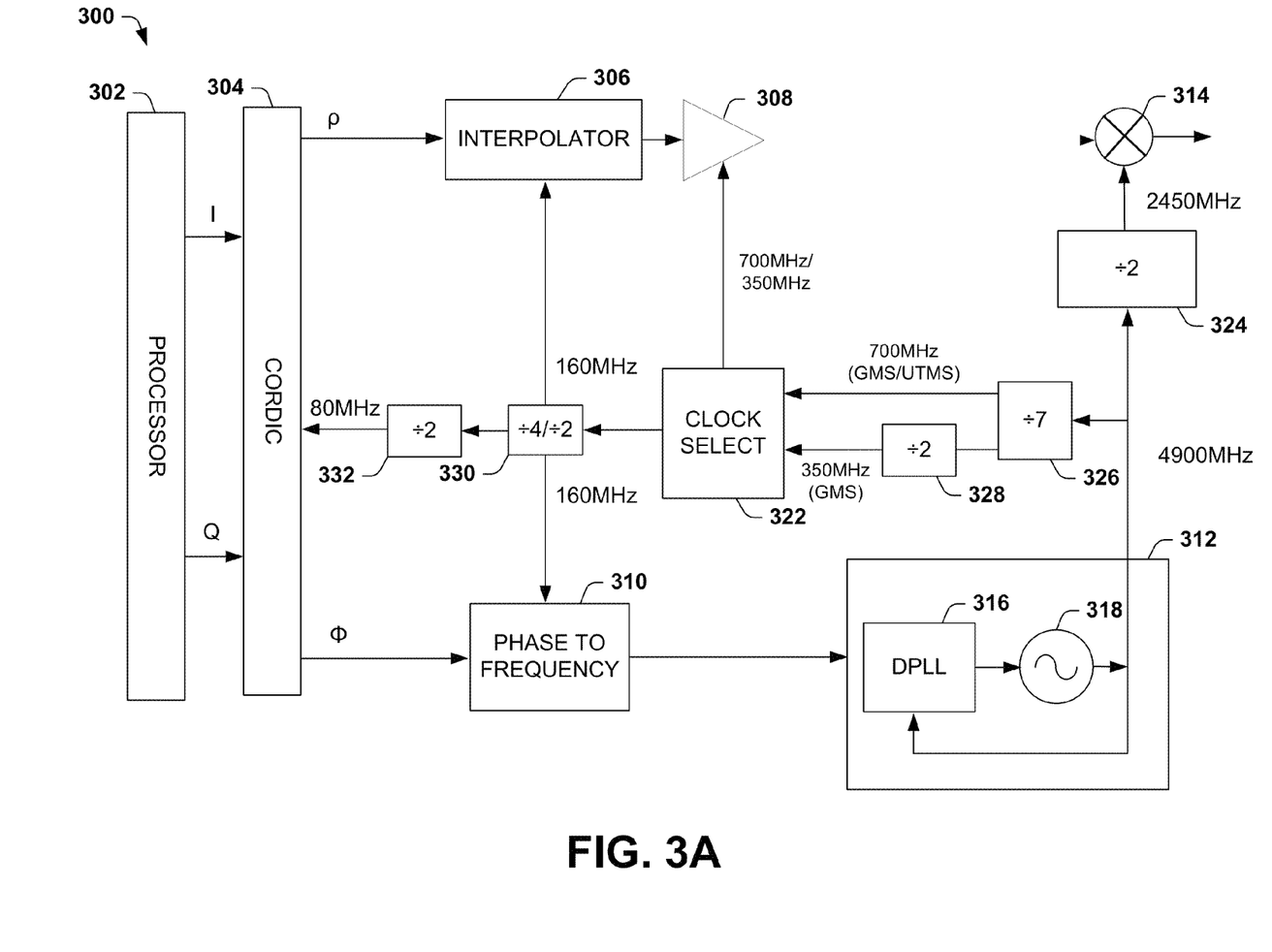
FIG. 3A is a block diagram illustrating a particular example of a polar modulation transmitter as provided herein.

FIG. 3A illustrates a more particular example of a block diagram of a polar modulation transmitter circuit 300 having a Bluetooth architecture suitable for integration into a GSM-UMTS-Bluetooth SoC, wherein exemplary frequencies are labeled on the diagram.

Figure 3B:
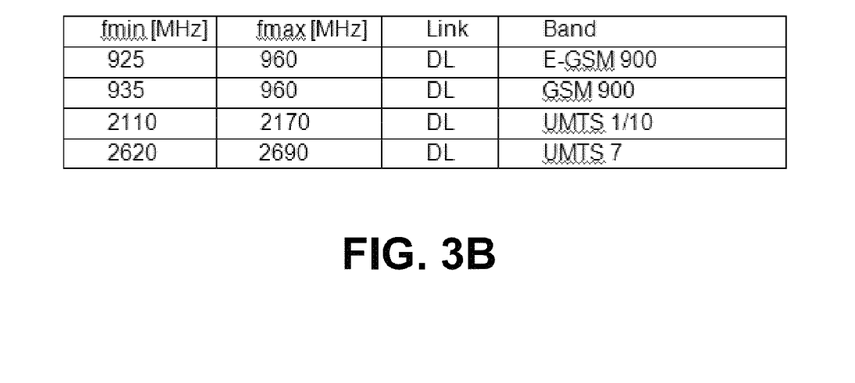
FIG. 3B is a graph comprising a list of GSM and UMTS downlink frequencies.

GSM and UMTS frequency bands or ranges are frequencies in which the GSM and UMTS communication systems operate. The GSM and UMTS can receive data at a plurality of downlink frequency bands. A subset of those frequency bands, relevant to FIG. 3A, is shown in FIG. 3B. It will be appreciated that the table in FIG. 3B is an incomplete list of the GSM and UMTS downlink bands (e.g., GSM has 14 downlink bands in all). As shown in FIG. 3B, each of the GSM and UMTS communication systems will cover a range of frequencies for download. For example, FIG. 3B shows that the UMTS can receive data in at least downlink frequencies between 2110 MHz-2170 MHz and 2620 and 2690 MHz.

Referring again to FIG. 3A, the polar modulation transmitter circuit 300 is configured to generate a carrier signal having a frequency within the Bluetooth operating frequency of 2402 MHz-2480 MHz without interfering with the transmission of other transmission systems (e.g., UMTS, GSM) on a same SoC. The polar modulation transmitter circuit 300 comprises a frequency generation circuit 312 having a DPLL 316 and a DCO 318. The DCO 318 is configured to generate a DCO signal having a frequency in the range of 4804 to 4960 MHz (hereinafter approximately 4900 MHz), twice that of the Bluetooth operating frequency. Selective use of frequency dividers (e.g., 326-332) allow the polar modulation transmitter circuit 300, shown in FIG. 3A, to operate in two different modes of operation, a normal mode and a low power mode.

In a normal mode of operation, wherein the polar modulation transmitter circuit 300 is configured to transmit a Bluetooth signal while receiving both GSM and UMTS signals, the output frequency of the DCO (approximately 4900 MHz) is provided directly to dividers 324 and 326. Divider 324 is configured to receive and divide the frequency of the DCO signal by 2. Divider 324 outputs a phase modulated carrier signal having a frequency of approximately 2450 MHz to a mixer 314. Divider 326 is configured to receive and divide the DCO signal by 7. Divider 326 outputs a signal having a frequency between 686 MHz and 709 MHz (hereinafter approximately 700 MHz) to the clock selection circuit 322, thereby driving sampling of the DAC 308 at a rate of approximately 700 MHz. The resulting AM signal has a spectral component which is around 0 Hz (baseband). However, because of the 700 MHz sampling frequency, unwanted alias replica having a frequency of approximately 700 MHz and harmonics thereof (e.g., 2 f~1400 MHz, 3 f~2100 MHz, etc.) are also present.

Figure 3C:
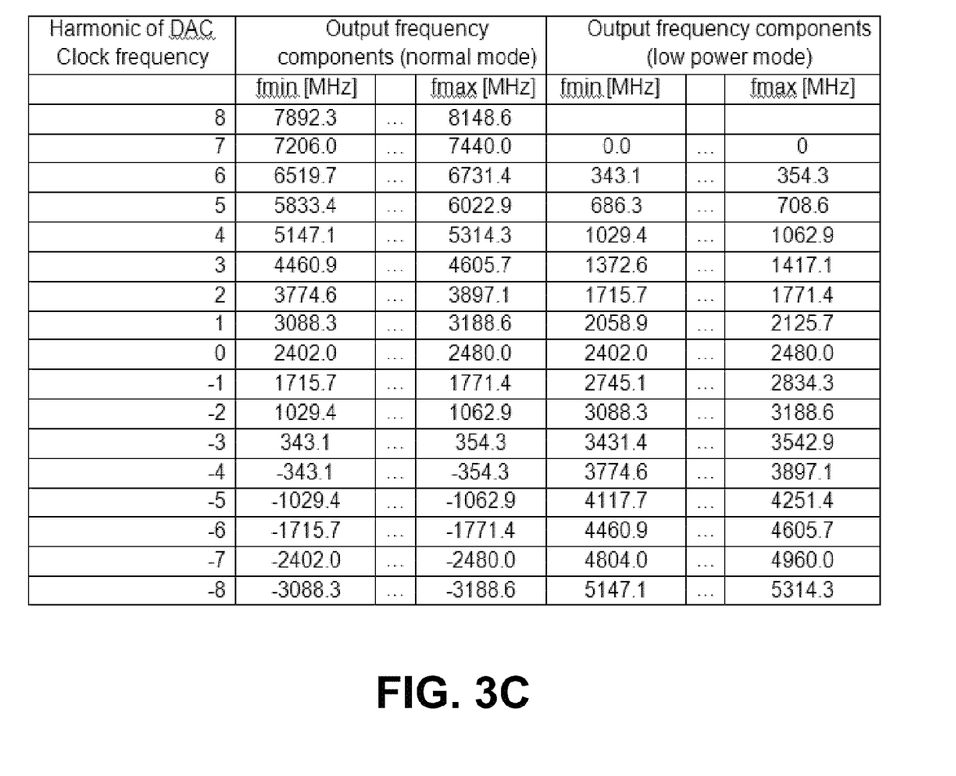
FIG. 3C is a graph comprising a list of output frequency components of the polar modulation transmitter shown in FIG. 3A.

The mixer 314 receives the analog amplitude modulated signal and modulates it onto the phase modulated carrier wave having a frequency of 2450 MHz. Mixing the analog AM signal (including alias replica and harmonics) with the 2450 MHz phase modulated carrier frequency results in an output signal $S_{OUT}$ having frequency components that are given in the table shown in FIG. 3C (normal mode column). Therefore, the output signal operates on a carrier wave frequency that may transmit Bluetooth signals (e.g., 2450 MHz)

without having frequency components that fall within the downlink frequency bands of either the GSM transmission system or the UMTS transmission system (e.g., see FIG. 3B) so that there are substantially no crosstalk effects within the integrated chip.

In a low-power mode of operation (e.g., having a lower current), wherein the polar modulation transmitter circuit 300 is configured to transmit a Bluetooth signal while receiving a GSM signal (and not receiving a UMTS signal), the DCO signal may be further provided to an additional divider 328, configured to divide by 2. The additional divider 328 results in the clock selection circuit 322 receiving an approximately 350 MHz sampling frequency. The resulting AM signal has a spectral component which is around 0 Hz (baseband). However, because of the 350 MHz sampling frequency, unwanted alias replica having a frequency of approximately 350 MHz and harmonics thereof are also present. Mixing the analog AM signal (and harmonics) with the 2450 MHz carrier frequency results in an output signal $S_{OUT}$ having frequency components that are given in the table shown in FIG. 3C (low power mode column). The frequency components of the low power output signal $S_{OUT}$ falls directly in the first harmonic (harmonic 1) of the UMTS downlink band. However, since the transmission circuit is not receiving a UMTS signal this does not cause interference (e.g., crosstalk) on the IC and is permissible in the low power mode.

The output frequency may be further divided by additional dividers in some embodiments. As shown in FIG. 3A, the frequency provided to the clock selection circuit 322 may be further provided to divider 330, configured to divide the frequency by 4 to generate a 160 MHz clock frequency used for operations in the digital part of the circuit, such as interpolators 306 and phase to frequency converter 310. An additional divider 332 may be configured to divide the 160 MHz clock frequency to an 80 MHz for use by the CORDIC 304.

In various embodiments, the one or more frequency dividers may have various divider ratios in different embodiments. For example, the DCO signal frequency shown in the example of FIG. 3A may be divided by frequency dividers having a divider ratio of $N_1$, where $N_1$ may be chosen to be 3, 4, 5, 6, 7, 9, or 12. Each of these $N_1$ values divide the DCO signal in such a manner as to result in a DAC clock frequency and harmonics that do not fall into GSM and UMTS downlink bands. However, the use of a divider ratio of $N_1=14$ generates frequencies that do not fall into the GSM band, but that do fall into the UMTS downlink band. For example, twice the bluetooth frequency range is 4804 to 4960 MHz. The use of a divider ratio of $N_1=14$ results in a DAC clock frequency that can have a first harmonic from 4804/14=341 to 4960/14=354 MHz being mixed with a carrier signal of 2402-2480 MHz carrier signal. The mixture of these harmonic frequencies and carrier signals results in a frequency output having a minimum of 2402−343.14=2058.9 MHz and having a maximum of 2480−354.3=2125.7 MHz (See FIG. 3C, low power mode column). The maximum frequency of 2125.7 MHz is within the range of the UMTS 1/10 band shown in FIG. 3A.

It will be appreciated that since there is no antialiasing filter after the DAC 308, the repetition spectra appear directly at the output of the DAC 308 (filtered by the zero order hold of the DAC, the inherent bandpass function of the mixer tank, and any external bandpass filter). Therefore, in one embodiment a high DAC sampling frequency may be chosen so that an external bandpass filter may provide adequate suppression of the repetition spectra.

Figure 4:
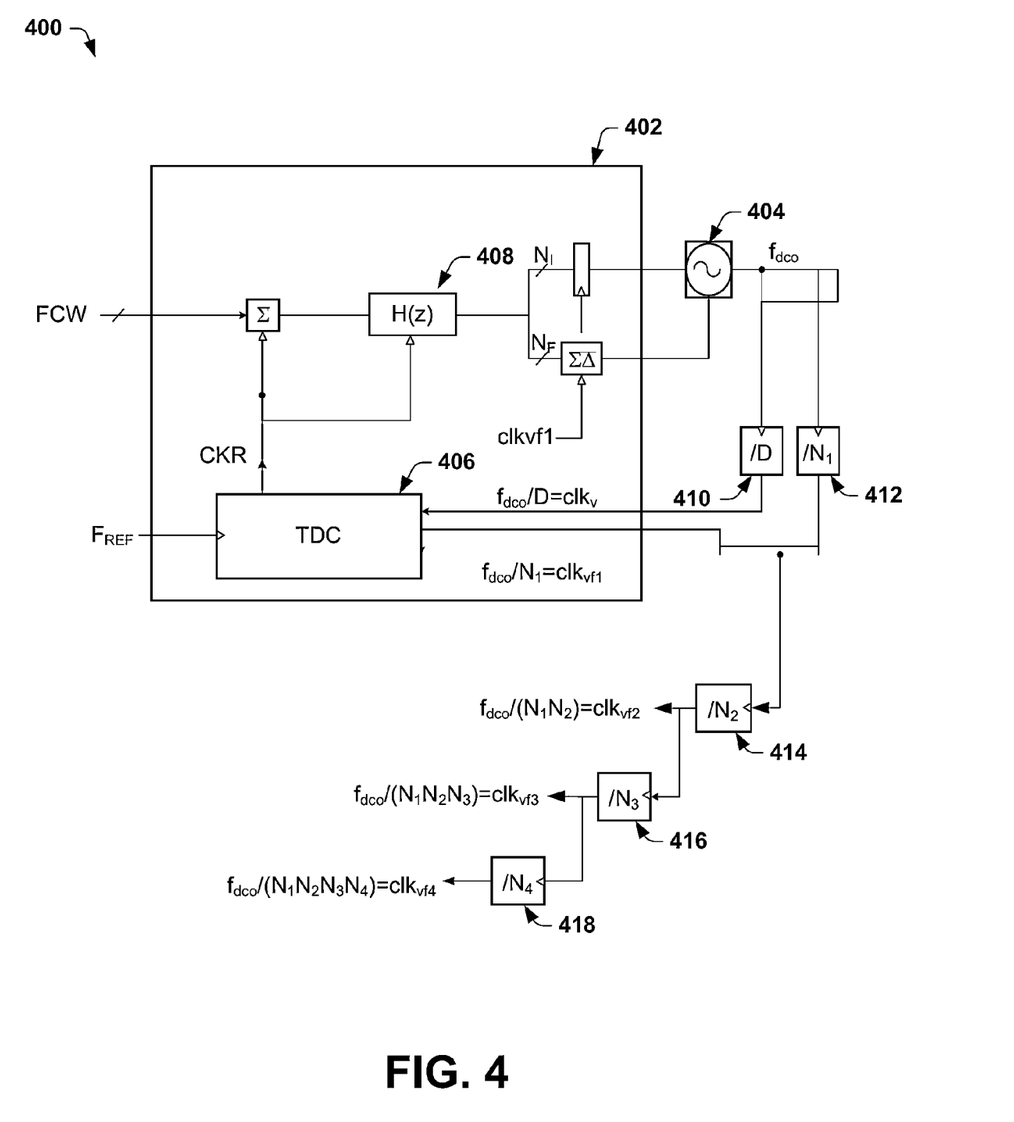
FIG. 4 is a more detailed block diagram of a frequency generation circuit as provided herein.

In one embodiment, the frequencies generated by the one or more dividers are derived by the DCO frequency by integer division, as shown in FIG. 4. FIG. 4 is a block diagram illustrating a more detailed exemplary embodiment of a frequency generation circuit 400 as provided herein. As shown in FIG. 4, the frequency generation circuit 400 comprises a DPLL 402, a DCO 404, and a plurality of frequency dividers 410-418. The DPLL 402 further comprises a TDC 406 configured to measure the time delay between the phase of a reference clock input $F_{REF}$ and the phase of a divide by D digital controlled oscillator signal $f_{dco}/D$ output from frequency divider 410. The output from the TDC 406 is a digital word CKR representing the phase/time error between the two signals $F_{REF}$ and $f_{dco}/D$. The digital word CKR output from the TDC 406 is filtered and processed by a digital loop filter 408. The digital loop filter 408 therefore provides a frequency control word, representing an error between the instantaneous operating frequency and the newly desired operating frequency of the DCO, to the DCO 404.

The frequency dividers 412, 414, 416, and 418 are configured to divide the output frequency of the DCO 404 by divider ratios having integer values, $N_1$, $N_2$, $N_3$, and $N_4$. As shown in FIG. 4, each frequency divider 412, 414, 416, and 418 is configured to divide the signal output from the previous frequency divider to generate an additional clock signal. For example, frequency divider 412 is configured to divide the DCO frequency $f_{dco}$ by an integer $N_1$ to generate a first clock frequency $clk_{vf1}$ that is equal to the DCO frequency $f_{dco}$ divided by an integer $N_1$. Frequency divider 414 is configured to divide the signal output from frequency divider 412 by an integer $N_2$, resulting in a clock frequency $clk_{vf2}$ that is equal to the DCO frequency $f_{dco}$ divided by an integer $N_1*N_2$. It will be appreciated the frequency generation circuit 400 is not a limiting example and that the number of dividers and divider ratios may be varied as provided herein.

Figure 5:
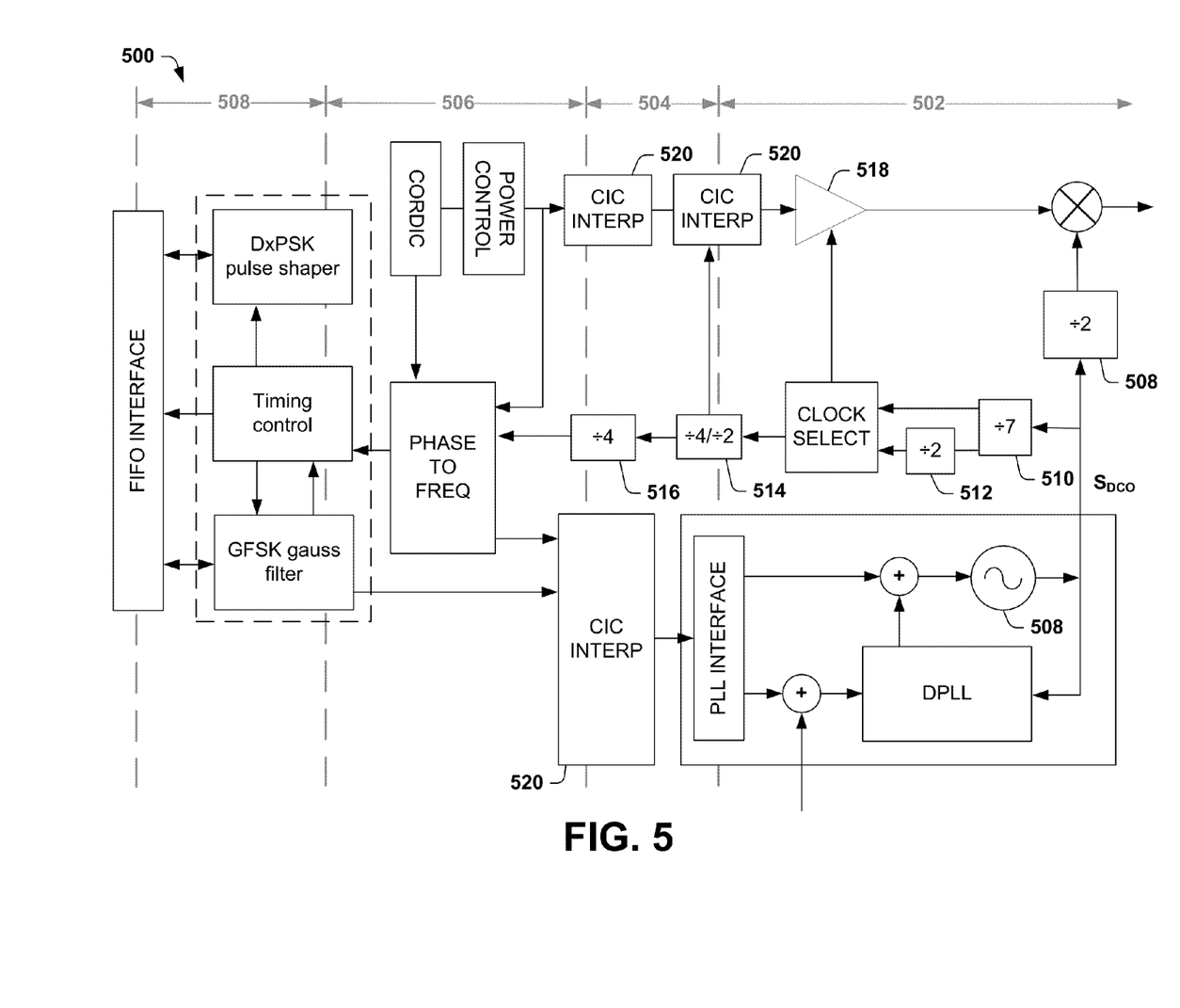
FIG. 5 is a more detailed block diagram of a polar modulation transmitter as provided herein.

FIG. 5 illustrates a more detailed block diagram of a Bluetooth polar transmitter 500 as provided herein. FIG. 5 illustrates a polar transmitter having a plurality of frequency dividers configured to generate three different "frequency regions", wherein the transmitter operations performed in each of the frequency regions are dependent upon a reduction of a DCO frequency equal to twice the Bluetooth operating frequency (e.g., 4804 to 4960 MHz). It will be appreciated that FIG. 5 illustrates a simplified example of a divider configuration that may be used to generate a number of frequency regions and is not intended as a limiting example.

In a first region 502, the frequency of the output signal $S_{DCO}$ from DCO 508 is divided by frequency dividers 510 to generate operating frequencies of 686 MHz-708 MHz or collectively by divider 510 and 512 to generate operating frequencies of 343 MHz-354 MHz. The frequencies in the first region 502 are used to generate a clock signal that drives sampling of DAC 518 to generate an analog amplitude modulated current having a desired frequency.

In a second region 504, the frequency of the output signal $S_{DCO}$ from DCO 508 is further divided by divider 514 to generate an operating frequency of 171 MHz-177 MHz for certain digital operations. As shown in FIG. 5, a further integer division by 4 (or 2 depending on the selective use of dividers 510 and 512) generates an a signal for digital operations in both the amplitude and modulation path. These digital operations may comprise CIC interpolation of the AM signal and/or PM signal(s) by interpolator(s) 520.

In a third region 506, the frequency of the output signal $S_{DCO}$ from DCO 508 is further divided by divider 516 to generate an operating frequency of 42 MHz-44 MHz. As shown in FIG. 5, a further integer division by 4 generates a signal for other operations in the digital part of the polar transmitter such as the CORDIC and pulse shaping filter respectively.

A further divider (not shown) may be used to divide the 42 MHz-44 MHz signal down to 10-11 MHz clock signal for use in a fourth region 508. The 10-11 MHz clock signal may be used in digital operation of additional components such as the DxPSK pulse shaper and/or timing control, etc.

It will be appreciated that having multiple frequency regions may useful for operation of the polar transmitter 500. For example, changes in the frequency of the DAC sampling rate also drive changes in digital operations of the polar transmitter 500 (e.g., changes in the clock frequency provided to DAC 518 may drive changes in the interpolation rate of interpolators 520 in the AM signal path). In order to take the reduction of the interpolator rate into account, digital amplitude words configured to drive the interpolators may be rescaled accordingly. The rescaling operation may be effectively performed at a lower rate than the high clock rate that is used for the DAC sampling. For example, the operating frequency is used to generate a digital amplitude control word that is provided to the interpolators to shift the digital AM signal to a proper sampling rate before it is provided to DAC 518.

Figure 6:
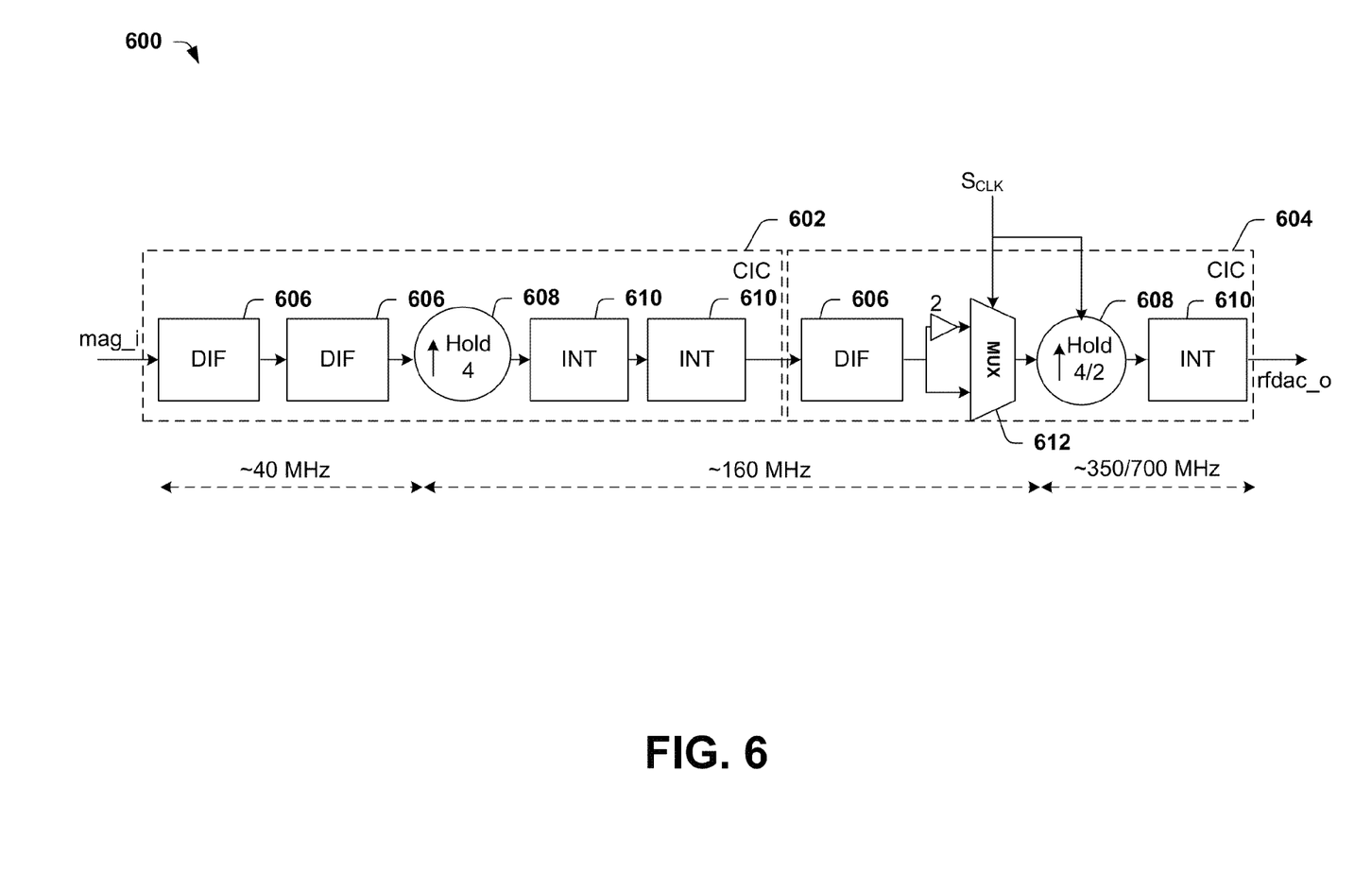
FIG. 6 is a block diagram of interpolator circuits that may be comprised within a polar modulation transmitter as provided herein.

In one embodiment, shown in FIG. 6, the resizing of the digital amplitude control word may be implemented into CIC interpolators through use of a multiplexor. In particular, FIG. 6 illustrates two CIC interpolators 602 and 604 configured to generate an output signal rfdac_o provided to an RF DAC. CIC interpolator 602 performs interpolation between 40 MHz and 160 MHz and CIC interpolator 604 performs interpolation between 160 MHz and 700 MHz. Each CIC interpolator comprises a differentiator stage having one or more differentiators 606, an up-sampler 608, and an integrator stage having one or more integrators 610. CIC interpolator 604 furthermore comprises a multiplexor 612 configured to compensate for the different gain the interpolator filter has when it is running at 350 or 700 MHz.

As shown in FIG. 6, the multiplexor 612 and up-sampler 608 are configured to add the output provided by the 160 MHz section. Therefore, when running at 700 MHz (e.g., 700 MHz clock signal $S_{CLK}$) the multiplexor 612 accumulates 4 results for every 160 MHz clock cycle. Alternatively, when running at 350 MHz the multiplexor accumulates 2 results for every 160 MHz clock cycle. Accordingly, when running at 700 MHz the multiplexor provides for a double gain compared to the 350 MHz case. It will be appreciated that the multiplexor 612 shown in FIG. 6 may be implemented at different positions within the chain CIC interpolator chain.

It will be appreciated that a division by 4 to generate the main 160 MHz clock signal, configured to drive the 160 MHz section may be generated to have a duty cycle of ~50% to ease timing requirements on the digital part. However, this clock signal is not synchronous to 700 MHz since it is derived from a flip-flop output. Therefore, in order to reliably transfer signals from the 160 MHz domain into the 700 MHz domain, the 160 MHz clock signals may be derived by pulse swallowing from 700 MHz such that signals from the 160 MHz domain are sampled at roughly the falling edge of the 160 MHz signal. This gives the maximum margin for both timing variation in generating 160 MHz as well as signal delays between the digital and analog macros. A handshaking asynchronous interface to the RF FIFO transfers bits at maximum 3 Mbps from the BMC clock domain to the TX clock domain.

Figure 7:
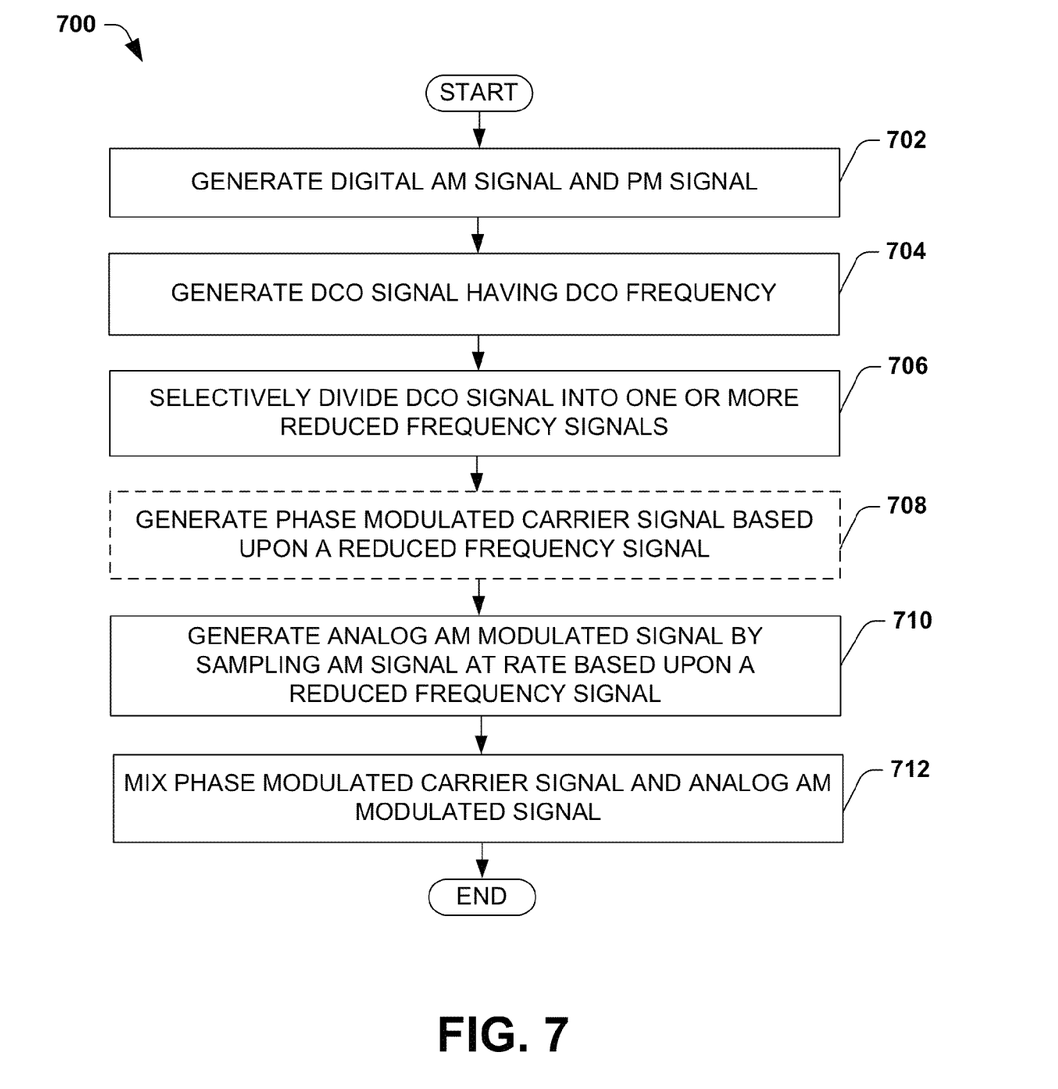
FIG. 7 is a flowchart diagram illustrating a method for generating an output signal at a desired frequency in accordance with some embodiments.

FIG. 7 is a flow diagram 700 illustrating an exemplary method for generating an output signal at a desired frequency in accordance with some embodiments. The method may be used on a SoC to generate an output signal for transmission on one RF band (e.g., Bluetooth) concurrent with receiving signals on other RF bands (e.g., UMTS, GSM), while avoiding crosstalk effects. The method generates an output signal through the selective generation of a plurality of different frequencies that may be used in operation of the polar transmitter.

While these methods are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIGS. 2, 3A, 4, etc., are non-limiting examples of circuits that may be used to implement method 700). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 702 digital amplitude modulated (AM) and phase modulated (PM) signals are generated. The AM and PM signals may be generated based upon an orthogonal in-phase (I) and quadrature-phase (Q) symbols of a digital signal to be transmitted.

At 704 a digitally controlled oscillator (DCO) signal is generated. The DCO signal comprises a DCO frequency. In one embodiment, the DCO frequency may be twice that of the Bluetooth operating frequency (e.g., 4804-4960 MHz).

The DCO signal is selectively divided into one or more lower frequency signals at 706. It will be appreciated that a selective division factor may depend on the operation conditions (e.g., GMS and/or UMTS) that are present at a given time. The one or more lower frequency signals may comprise a wide range of different frequency signals that may be used throughout the polar transmitter. For example, the selective division may reduce the frequency of the DCO signal and provide a phase modulated carrier signal having a reduced frequency. The selective division may also provide a signal having a reduced frequency to a clock selection circuit, which generates a clock signal for sampling of the AM signal.

Additional division may generate clock signals having a further reduced frequencies to drive operations in digital parts of a polar transmitter. For example, in one embodiment, additional division may reduce the frequency provided to the clock selection circuit to a lower frequency for interpolation and/or to an even lower frequency to drive polar conversion of the I/Q signals.

A phase modulated carrier signal is generated based upon one of the reduced frequency signals at 708. The phase modulated carrier signal may comprise a divided DCO signal in one embodiment.

An analog AM signal is generated by sampling a digital AM signal at a rate based upon one of the reduced frequency signals at 710. The sampling may result in successive digital data values being separated by a selected time period based upon the reduced frequency signals, therefore allowing changes in the frequency of the analog AM signal.

The analog AM signal is mixed with a phase modulated carrier signal at 712. As stated above, the PM carrier signal may comprise one of the reduced frequency signals. Mixing the analog AM signal and the phase modulated carrier signal may comprise modulating the AM signal onto a phase modulated RF carrier signal. The selective frequency of the analog AM signal and phase modulated signals, generated by division of the DCO signal, results in an output signal having a transmission frequency that does not interfere with other communication system bands (e.g., Bluetooth, GSM, UMTS, etc.).

Therefore, an output signal is generated to have a particular frequency, through the selective division of a DCO signal having a DCO frequency, that minimizes crosstalk effects between multiple different communication systems.

Although examples of techniques that are consistent with some implementations have been illustrated and described with respect to one or more implementations above, alterations and/or modifications may be made to the illustrated examples without departing from the spirit and scope of the appended claims. For example, although various ADCs and digital codes are used within this disclosure these are only used to facilitate reader understanding and are not intended to limit the scope of the invention.

For example, although the examples are described in regards to specific RF communication systems (e.g., Bluetooth, UMTS, GSM, etc.), the invention is not limited to use with those RF communications systems or RF communications systems in general. Instead, the invention provided herein may be broadly used to selectively generate a specified frequency through the use of the divider circuits provided herein and therefore may be integrated into different transceiver/transmitter architectures.

Furthermore, certain terms are used throughout the specification to refer to particular system components. As one skilled in the art will appreciate, different companies can refer to a component by different names. This document does not intend to distinguish between components that differ in name but not function herein. In this document the terms "including" and "comprising" are used in an open ended fashion, and thus should be interpreted to mean "including, but not limited to . . . ." Also, the term "couple" (and variations thereof) is intended to mean either an indirect or direct electrical connection. Thus, if a first element couples to a second element, that connection may be a direct electrical connection, or may be an indirect electrical connection via other elements and connections.

Although various numeric values are provided herein, these numeric values are merely examples should not be used to limit the scope of the disclosure. Also, all numeric values are approximate.

In addition, while a particular feature may have been disclosed with respect to only one of several implementations, such feature may be combined with one or more other features of the other implementations as may be desired and advantageous for any given or particular application.

What is claimed is:

1. A transmission circuit configured to transmit over a plurality of transmission signal bands, comprising:
   a polar converter configured modulate an amplitude of an input signal to generate an amplitude modulated signal and to modulate a phase of the input signal to generate a phase modulated signal;
   a digitally controlled oscillator (DCO) configured to generate a DCO signal having a DCO frequency that depends upon the phase modulated signal;
   one or more frequency dividers configured to selectively generate one or more reduced frequency signals by selectively dividing the DCO signal, wherein one of the reduced frequency signals comprises a phase modulated carrier signal;
   a clock selection circuit configured to receive one of the reduced frequency signals and based thereupon to generate a sampling frequency;
   a digital to analog converter (DAC) configured to receive the sampling frequency from the clock selection circuit and to sample a digital amplitude modulated signal at the sampling frequency to generate an analog amplitude modulated signal; and
   a mixer configured to combine the analog amplitude modulated signal and the phase modulated carrier signal to generate an output signal having a frequency that is outside of the downlink frequencies of other signals within the plurality of transmission signal bands.

2. The circuit of claim 1, wherein the one or more frequency dividers comprise a first frequency divider configured to divide the DCO frequency by an integer value and to output a first divided frequency to the mixer as the phase modulated carrier signal.

3. The circuit of claim 1, wherein the one or more frequency dividers further comprise:
   a second frequency divider configured to output a second divided frequency to both the clock selection circuit and to a third frequency divider, the third frequency dividers is configured to selectively divide the output of the second frequency divider and provide a third divided frequency to the clock selection circuit;
   wherein the second divided frequency is provided to the clock selection circuit during a first mode of operation related to the reception over a first transmission signal band, and
   wherein the third divided frequency is provided to the clock selection circuit during a second mode of operation related to the reception over a second transmission signal band, different than the first transmission band.

4. The circuit of claim 3, wherein the second mode of operation provides a reduced power in comparison to the first mode of operation.

5. The circuit of claim 1, wherein the one or more frequency dividers further comprise:
   a fourth frequency divider configured to receive a signal at the sampling frequency, to divide the signal to generate a fourth divider signal,
   wherein the fourth divider signal is provided to a digital signal processing sections of the polar transmitter.

6. The circuit of claim 5, wherein one or more interpolators are configured to receive the fourth divider signal and to increase the frequency of the digital signal before it is provided to the DAC.

7. The circuit of claim 1, wherein the polar modulation transmitter circuit comprises a Bluetooth architecture suitable for integration into a GSM-UMTS-Bluetooth system on a chip.

8. The circuit of claim 1, wherein switching of the dividers can be controlled by firmware after getting a request from a host to activate or deactivate a certain transmission system.

9. The circuit of claim 1, wherein the frequencies used in the polar modulation transmitter are derived from the DCO frequency by integer division.

10. A frequency generation circuit, comprising:
    an oscillator circuit configured to generate an oscillator signal having an oscillator frequency;
    one or more frequency dividers configured to selectively divide the oscillator signal to selectively generate one or more reduced frequency signals therefrom by switching between different frequency dividers having different divider ratios during different modes of operation, wherein during the different modes of operation transmission systems sharing the frequency generation circuit are configured to receive transmissions over different transmission bands; and a mixer configured to combine an amplitude modulated signal, based upon one of the one or more reduced frequency signals, with a phase modulated carrier signal which is based on another one of the one or more reduced frequency signals to generate an output signal having a frequency different than one or more frequencies of other signals within a plurality of transmission signal bands.

11. The frequency generation circuit of claim 10, wherein the one or more reduced frequencies are derived from the oscillator frequency by integer division.

12. The frequency generation circuit of claim 10, wherein switching between the different frequency dividers can be controlled by firmware after getting a request from a host to activate or deactivate a certain transmission system.

13. The frequency generation circuit of claim 12, wherein the one or more frequency dividers comprise a first frequency divider configured to divide the oscillator frequency by an integer value and to output the first divided frequency to the mixer as the phase modulated carrier signal.

14. The frequency generation circuit of claim 13, wherein the one or more frequency dividers further comprise:
a second frequency divider configured to output a second divided frequency to both the clock selection circuit and to a third frequency divider, the third frequency dividers is configured to selectively divide the output of the second frequency divider and provide a third divided frequency to the clock selection circuit
wherein in a first mode of operation the second divided frequency is provided and third divided frequencies are provided to the clock selection circuit to generate output signals having frequencies is outside of the downlink bands of other different transmission systems.

15. The frequency generation circuit of claim 14, wherein the frequency generation circuit is comprised within a polar modulation transmitter circuit having a GSM-UMTS-Bluetooth system on a chip.

16. A transmission circuit configured to transmit over a plurality of transmission signal bands, comprising:
a digitally controlled oscillator (DCO) configured to generate a DCO signal having a DCO frequency;
one or more frequency dividers configured to selectively generate one or more reduced frequency signals by selectively dividing the DCO signal;
a clock selection circuit configured to receive one of the reduced frequency signals and based thereupon to generate a sampling frequency;
a digital to analog converter (DAC) configured to sample a digital amplitude modulated signal at the sampling frequency to generate an analog amplitude modulated signal; and
a mixer configured to combine the analog amplitude modulated signal and a phase modulated carrier signal to generate an output signal having a frequency that is outside of the downlink frequencies of other signals within the plurality of transmission signal bands.

17. The transmission circuit of claim 16, wherein the phase modulated carrier signal comprises one of the reduced frequency signals not employed to generate the sampling frequency.

18. The transmission circuit of claim 16,
wherein the transmission circuit comprises a Bluetooth architecture suitable for integration into a GSM-UMTS-Bluetooth system on a chip, or
wherein switching of the one or more frequency dividers can be controlled by firmware after getting a request from a host to activate or deactivate a certain transmission system, or
wherein the frequencies used in the transmission circuit are derived from the DCO frequency by integer division.

* * * * *